United States Patent [19]

Varrasso et al.

[11] Patent Number: 4,819,248

[45] Date of Patent: Apr. 4, 1989

[54] ELECTRODE MONITORING SYSTEM

[75] Inventors: Eugene C. Varrasso, Heath; Glen F. Day, Gambier, both of Ohio

[73] Assignee: Owens-Corning Fiberglas Corporation, Toledo, Ohio

[21] Appl. No.: 193,618

[22] Filed: May 13, 1988

[51] Int. Cl.[4] .............................................. C03B 5/027

[52] U.S. Cl. ...................................................... 373/39

[58] Field of Search ....................... 373/38, 39, 40, 41, 373/36, 37

[56] References Cited

U.S. PATENT DOCUMENTS

| | | |
|---|---|---|
| 3,176,215 | 3/1965 | Kusko . |
| 3,585,267 | 6/1971 | Obersby . |
| 3,634,588 | 1/1972 | Steitz et al. . |
| 3,984,611 | 10/1976 | Varrasso . |
| 4,063,027 | 12/1977 | Varrasso et al. . |
| 4,107,446 | 8/1978 | Pieper . |
| 4,293,730 | 10/1981 | Myers .................................... 373/40 |

*Primary Examiner*—Roy N. Envall, Jr.
*Attorney, Agent, or Firm*—Patrick P. Pacella; Ronald E. Champion

[57] ABSTRACT

An apparatus and method for making electrical resistance measurements of individual powered electrodes within a glass heating furnace is disclosed. The powered electrodes are energized in pairs with electrical power supplied at a relatively low frequency, causing electrical currents flow between the pairs of powered electrodes through a pool of molten glass so as to generate heat therein. A single reference electrode is also provided within the furnace. Each of the powered electrodes is sequentially paired with the reference electrode to permit voltage and current measurements to be made. To accomplish such measurements, a relatively small high frequency electrical signal is supplied to the powered electrode, in addition to the relatively low frequency heating power supplied thereto. As a result, a measurement current flows between the selected powered electrode and the reference electrode. By selecting the high frequency measurement signal to be unrelated as a harmonic to the low frequency heating power, the effect of the heating power electrical signals on the measurement electrical signal can be greatly reduced. A current feedback circuit is provided to maintain a constant value for the high frequency measurement signal.

18 Claims, 2 Drawing Sheets

ELECTRODE MONITORING SYSTEM

TECHNICAL FIELD

The present invention relates in general to electrode monitoring systems in glass heating furnaces and in particular to an improved apparatus and method for making electrical resistance measurements of individual powered electrodes within such a furnace.

BACKGROUND OF THE INVENTION

In a conventional Joule effect glass heating furnace, a source of electrical energy is connected to a pair of powered electrodes immersed in a pool of molten glass. The molten glass acts as an electrical conductor, thereby permitting an electric current to flow therethrough between the powered electrodes. However, the molten glass also exhibits a certain amount of resistance to such current flow. As a result, the molten glass is heated as the current is passed therethrough. The total value of the electrical resistance experienced by the source of electrical energy is equal to the sum of the individual resistances of the molten glass and the two powered electrodes.

The resistance of the molten glass can be calculated as a function of the glass composition, the average temperature of the molten glass, and the length of the electrical path therethrough. For each of the powered electrodes, it is known that the electrical resistance thereof varies with its operating condition. For example, wear, erosion, internal cracks, and similar defects can change the effective surface area of a powered electrode and thereby alter the electrical resistance thereof. As the operating condition of a powered electrode changes, the flow of electrical current therethrough is also changed, assuming that the magnitude of the electrical energy supplied by the source remains constant. Thus, by measuring changes in the flow of electric current through the molten glass, information can be obtained regarding the operating condition of the pair of powered electrodes as they are used in the molten glass. Such information can alert an operator of the furnace of an impending failure of one of the electrodes, which can result in catastrophic damage to the furnace and injury to persons in the area.

Previous electrode resistance monitoring methods are known which sense electrical voltages and currents supplied to a powered electrode pair within a glass heating furnace. However, some of such known methods are subject to errors because of cross coupling with other electrode pairs in the furnace, which continue to be powered to heat the molten glass while measurements are being made. Additionally, such prior methods could not identify which of the two electrodes within a particular pair was defective. Other methods contemplate that the heating power be disconnected from the electrodes for a short period of time while measurement currents are passed between the electrodes. Unfortunately, disconnecting the heating power, even for a short time, may disrupt the flow of molten glass through the furnace, especially if the furnace is designed for relatively high flow rates.

SUMMARY OF THE INVENTION

The present invention relates to an improved apparatus and method for making electrical resistance measurements of individual powered electrodes within a glass heating furnace. The furnace is provided with a plurality of such powered electrodes, which are energized in pairs with electrical power supplied at a relatively low frequency. As a result, electrical currents flow between the pairs of powered electrodes through a pool of molten glass contained in the furnace so as to generate heat therein. A single reference electrode is also provided within the furnace. Each of the powered electrodes is sequentially paired with the reference electrode to permit voltage and current measurements to be made. To accomplish such measurements, a relatively small high frequency electrical signal is supplied to the powered electrode, in addition to the relatively low frequency heating power supplied thereto. As a result, a measurement current flows between the selected powered electrode and the reference electrode. By selecting the high frequency measurement signal to be unrelated as a harmonic to the low frequency heating power, the effect of the heating power electrical signals on the measurement electrical signal can be greatly reduced. Therefore, accurate voltage and current measurements can be made for the selected powered electrode. A computer calculates the resistance of the selected powered electrode based upon such measurements and compares such calculated resistance with predetermined values to determine when a failure has or is about to occur. A current feedback circuit is provided to maintain a constant value for the high frequency measurement signal.

It is an object of the present invention to provide an improved apparatus and method for making electrical resistance measurements of individual powered electrodes within a glass heating furnace.

It is another object of the present invention to provides such an apparatus and method which can be used simultaneously while the powered electrodes are supplied with heating power with a minimum amount error resulting from cross coupling.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
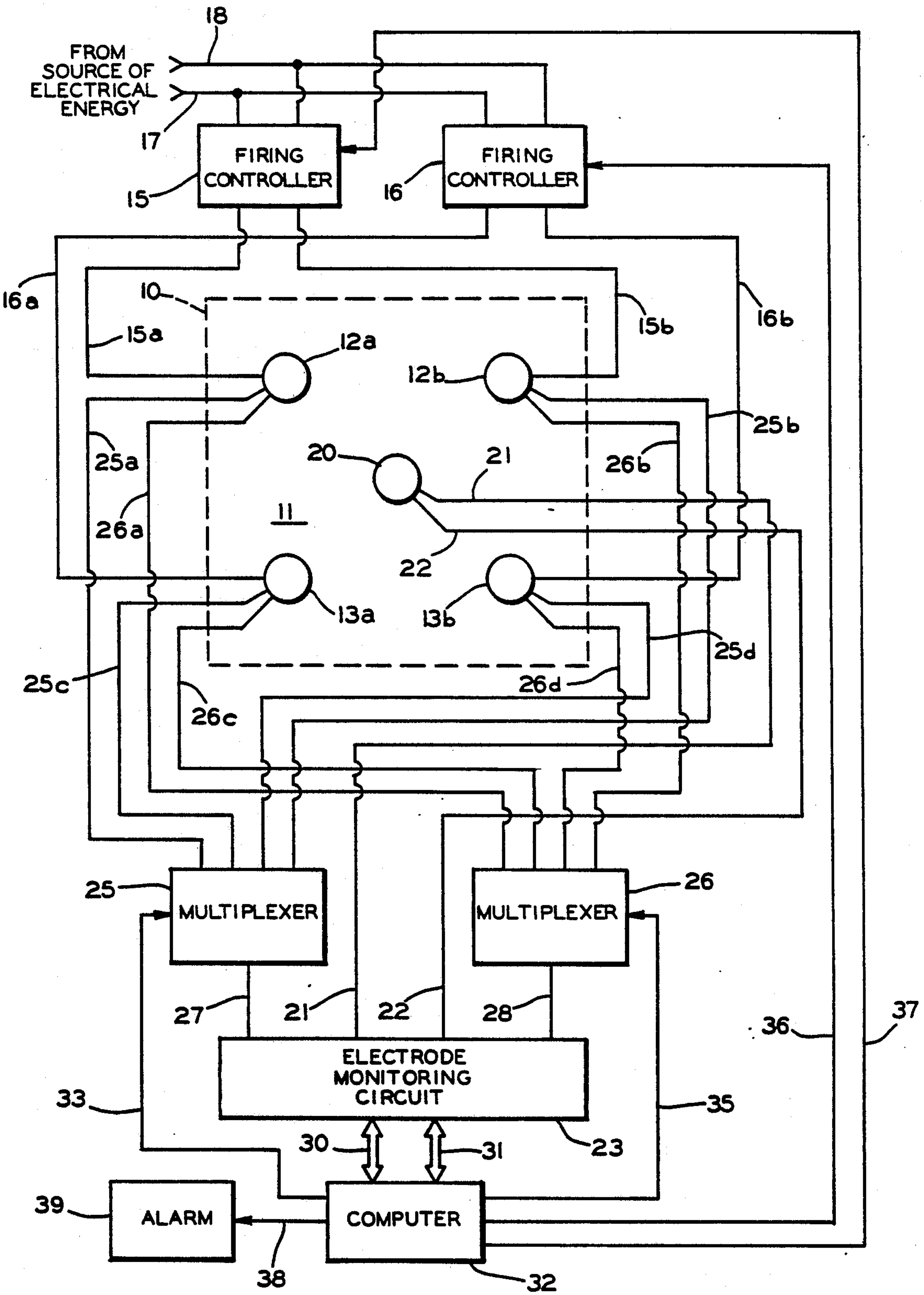
FIG. 1 is a schematic top plan view of an electric glass heating furnace and electrode monitoring system in accordance with the present invention.

Referring now to the drawings, there is illustrated in FIG. 1 a conventional glass heating furnace 10 including a reservoir (not shown) adapted to contain a pool of molten glass 11 therein. First and second pairs of powered electrodes *12a*, *12b* and *13a*, *13b*, respectively, are provided within the molten glass 11. As is known in the art, additional pairs of powered electrodes (not shown) may also be provided. The pairs of powered electrodes *12a*, *12b* and *13a*, *13b* extend upwardly within the furnace from a bottom surface thereof. The first powered electrodes *12a* and *12b* are connected by respective electrical conductors *15a* and *15b* to a first firing controller 15. Similarly, the second powered electrodes *13a* and *13b* are connected by respective electrical conductors *16a* and *16b* to a second firing controller 16.

Both of the firing controllers 15 and 16 are connected to a source of electrical energy (not shown) by a pair of electrical conductors 17 and 18. The firing controllers 15 and 16 are conventional in the art and are adapted to supply the respective pairs of powered electrodes 12*a*, 12*b* and 13*a*, 13*b* with electrical energy. Such electrical energy is usually supplied at a relatively low frequency, such as the normal line frequency of sixty cycles per second. As is well known in the art, the electrical energy supplied to each of the pairs of powered electrodes 12*a*, 12*b* and 13*a*, 13*b* causes an electrical current to flow therebetween through the molten glass 11. The electrical resistance of the molten glass 11 causes heat to be generated therein, thereby creating the basis for operation of the furnace 10.

A reference electrode 20 is also provided within the molten glass 11. The reference electrode 20 is preferably located near the geometric center of the powered electrodes 12*a*, 12*b*, 13*a*, and 13*b*. First and second electrical conductors 21 and 22 are connected between the reference electrode 20 and an electrode monitoring circuit 23. The structure and operation of the electrode monitoring circuit 23 is explained in detail below. First and second multiplexers 25 and 26 may be provided in the electrode monitoring system of the present invention. First electrical conductors 25*a*, 25*b*, 25*c*, and 25*d* are respectively connected between the powered electrodes 12*a*, 12*b*, 13*a*, and 13*b* and the inputs of the first multiplexer 25. Similarly, second electrical conductors 26*a*, 26*b*, 26*c*, and 26*d* are respectively connected between the powered electrodes 12*a*, 12*b*, 13*a*, and 13*b* and the inputs of the second multiplexer 26. Lines 27 and 28 are respectively connected between the outputs of the multiplexers 25 and 26 and the electrode monitoring circuit 23.

A pair of bi-directional bus lines 30 and 31 are connected between the electrode monitoring circuit 23 and a computer 32. The computer 32 is connected to the multiplexers 25 and 26 by respective electrical conductors 33 and 35. The computer 32 is also connected to the firing controllers 15 and 16 by respective electrical conductors 36 and 37. As will be explained in detail below, by generating appropriate signals on the lines 33, 35, 36, and 37, the computer controls the operation of the multiplexers 25 and 26 and the firing controllers 15 and 16. Lastly, the computer 32 is connected by a line 38 to an external alarm 39. Under appropriate circumstances, the computer 32 generates a signal on the line 38 activating the alarm, which is provided to alert an operator of the furnace 10 of an undesirable condition detected by the computer 32.

The multiplexer 25 selectively connects one of the input lines 25*a*, 25*b*, 25*c*, and 25*d* to the output line 27. Similarly, the multiplexer 26 selectively connects one of the input lines 26*a*, 26*b*, 26*c*, and 26*d* to the output line 28. The particular input lines selected by the multiplexers 25 and 26 for connection to the respective output lines may be determined by the signals generated by the computer 32 on the lines 33 and 35. For example, the computer 32 may generate appropriate signals on the lines 33 and 35 to cause the multiplexers 25 and 26 to respectively connect the input lines 25*c* and 26*c* (which are both connected to the powered electrode 13*a*) to the output lines 27 and 28. Alternatively, the multiplexers 25 and 26 may be free running, so as to sequentially select the input lines at a predetermined rate. In such a situation, the lines 33 and 35 would not be necessary. However, some means would preferably be provided for maintaining the multiplexers 25 and 26 in synchronization so as to insure that two input lines from the same selected powered electrode would be simultaneously connected to the output lines 27 and 28. Additionally, it would be desirable to provide a signal to the computer 32 which would permit it to identify which of the powered electrodes had been selected by the multiplexers 25 and 26.

Figure 2:
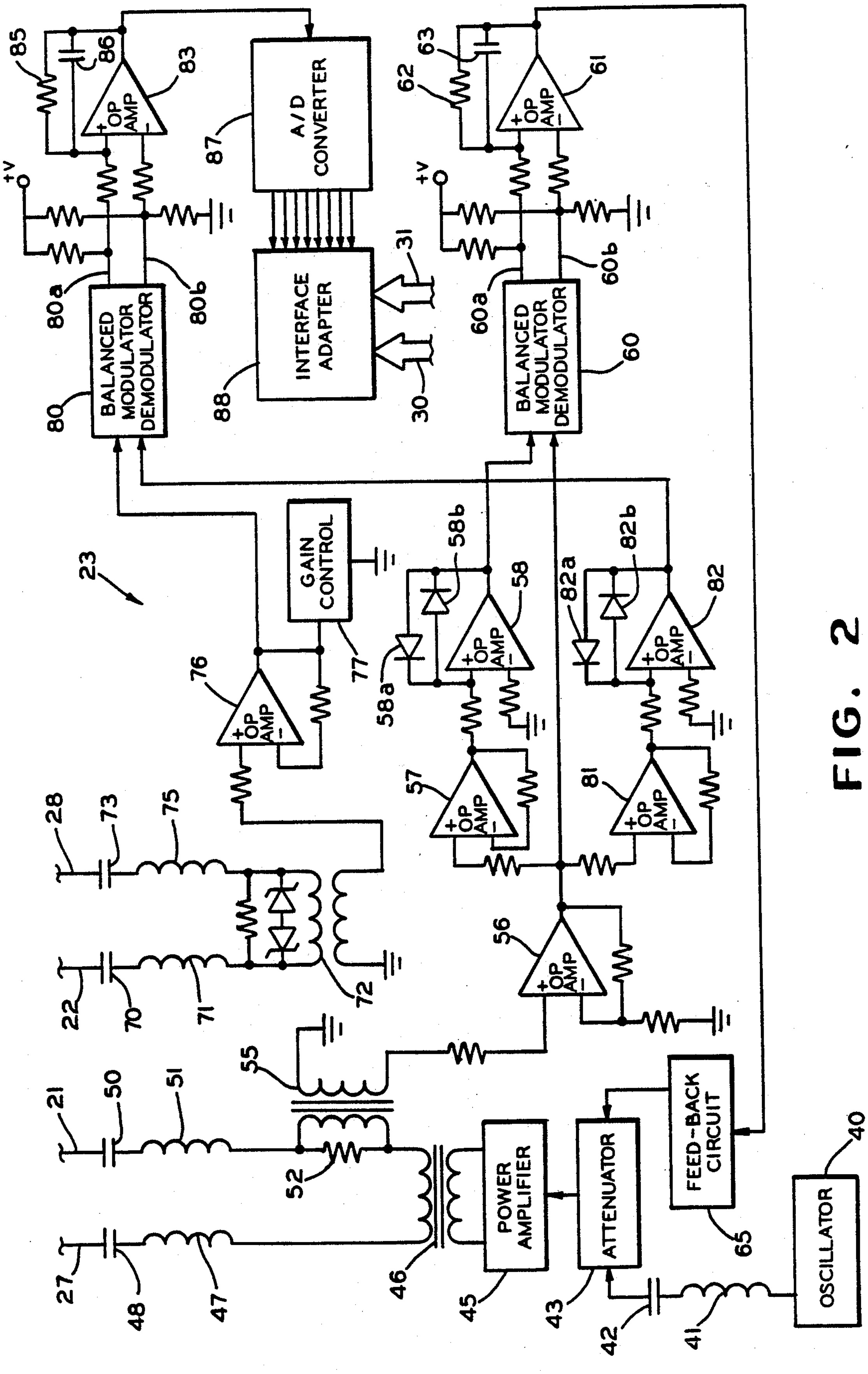
FIG. 2 is a schematic block diagram of the electrode monitoring system illustrated in FIG. 1.

Referring now to FIG. 2, the structure of the electrode monitoring circuit 23 is illustrated in detail. As shown therein, the circuit 23 includes an oscillator 40 adapted to generate an output signal therefrom at a constant predetermined frequency. The oscillator 40 is preferably embodied as a crystal oscillator because of its inherent frequency stability. If desired, the oscillator 40 may include a conventional frequency divider circuit (not shown) in combination with the crystal oscillator to provide the desired output frequency. Preferably, such output frequency from the oscillator 40 should not be equal to the frequency of the electrical energy supplied to the pairs of powered electrodes for heating the molten glass 11 as described above, nor should it be related to any harmonic thereof, for reasons which will be explained in detail below. For example, a 3.58 megahertz crystal oscillator connected in series with a divide-by-512 frequency divider circuit yields an output frequency of approximately 6992 cycles per second from the oscillator 40. Such a frequency has been found to be sufficiently unrelated to the normal line frequency of sixty cycles per second to permit accurate measurements to be made, as will be discussed further below.

The output of the oscillator 40 is connected through a first frequency filter, consisting of an inductor 41 and a capacitor 42 connected in series, to an attenuator circuit 43. The frequency filter is provided to reduce the magnitude of spurious electrical signals passed therethrough which differ in frequency from the output signal of the oscillator 40. The output of the attenuator circuit 43 is connected to the input of a power amplifier 45. The attenuator circuit 43 is conventional in the art and is adapted to pass the signal from the oscillator 40 therethrough to the power amplifier 45, varying only the magnitude thereof in response to a control signal. The means for generating the control signal (and, therefore, for varying the magnitude of the signal supplied to the input of the power amplifier 45), as well as the reasons therefor, will be explained below.

The output signal from the power amplifier 45 is an alternating current signal which is supplied to the primary coil of a transformer 46. In response thereto, an alternating current measurement signal is generated in the secondary coil of the transformer 46. One side of the secondary coil of the transformer 46 is connected through a second frequency filter circuit, consisting of an inductor 47 and a capacitor 48 connected in series, through the line 27 to the multiplexer 25. The line 21 from the reference electrode 20 is connected through a third frequency filter circuit, consisting of a capacitor 50 and an inductor 51 in series to a measurement resistor 52. The resistor 52 is connected to the other side of the secondary coil of the transformer 46. The second and third frequency filters perform the same function as the first frequency filter described above.

The resistor 52 is provided to generate an electrical signal which is representative of the amount of electric current which flows between the selected powered electrode and the reference electrode 20 in response to the measurement signal generated by the transformer 46. As is well known, the current flowing through the resistor 52 causes a voltage differential to be created thereacross. The resistor 52 can be selected to have a value of one ohm. As a result, the magnitude of the voltage differential across the resistor 52 is equal to the magnitude of the current which flows therethrough and, therefore, which flows between the selected powered electrode and the reference electrode 20. This signal will be referred to as the sensed current signal and is equal in magnitude to the measurement signal generated by the transformer 46.

The primary coil of a second transformer 55 is connected in parallel across the resistor 52. One side of the secondary coil of the transformer 55 is connected to ground potential, while other side thereof is connected to the non-inverting input of an operational amplifier 56. The magnitude of the signal applied to the non-inverting input of the operational amplifier 56 is proportional to the magnitude of the sensed current signal. The operational amplifier 56 is provided to amplify the magnitude of the output signal from the transformer 55 such that it is equal in magnitude to the sensed current signal.

The sensed current signal from the operational amplifier 56 is fed to the input of a first pair of operational amplifiers 57 and 58. The first operational amplifier 57 is provided to amplify the magnitude of the sensed current signal to within a convenient working range. The second operational amplifier 58 is provided with a pair of reversed diodes 58a and 58b connected in parallel in its feedback loop to limit the peak magnitude of the output signal therefrom to within a predetermined range. The output signal from the operational amplifiers 57 and 58 is fed to a first input of a first balanced demodulator circuit 60. A second input of the demodulator circuit 60 is connected directly to the output of the operational amplifier 56 and, therefore, receives the sensed current signal. The demodulator circuit 60 is conventional in the art and may be embodied as an LM1496 balanced modulator/ demodulator circuit manufactured by National Semiconductor Corporation. The demodulator circuit 60 generates an output signal which is proportional to the product of the two input signals. Because the two input signals of the demodulator circuit 60 oscillate at the same frequency (the same relatively high frequency signal generated by the oscillator 40), the demodulator circuit 60 functions as a synchronous demodulator or detector.

The demodulator circuit 60 generates balanced output signals on a pair of lines **60*a* and 60*b* to the inverting and non-inverting inputs of an operational amplifier 61. The operational amplifier 61 includes a resistor 62 and a capacitor 63 connected in a feedback loop with the non-inverting input thereto. The operational amplifier 61 generates a direct current output signal which is representative of the magnitude of the sensed current signal. The direct current output signal is fed to a feedback circuit 65, which is connected to the attenuator circuit 43. The feedback circuit 65 is conventional in the art and is adapted to supply the control signal to the attenuator circuit 43**.

Within the feedback circuit 65, the output signal from the operational amplifier 61 is compared with a predetermined reference signal. The control signal mentioned above is generated by the feedback circuit 65 having a magnitude which is proportional to the magnitude of the difference between the output signal from the operational amplifier 61 and the reference signal. Thus, the reference signal represents the desired magnitude of the measurement signal to be generated under all conditions of operation of the selected powered electrode. In other words, the magnitude of the measurement signal should be constant regardless of changes in the resistance of the selected powered electrode.

The reference signal can be selected such that the power amplifier 45 generates the measurement signal at a constant current of one ampere through the lines 27 and 21. The reasons for selecting a constant current of one ampere will be explained below. The feedback circuit 65 continuously compares the direct current output signal from the operational amplifier 61 with the reference signal to maintain the magnitude of this signal constant. As noted above, the attenuator circuit 43 is responsive to the control signal for varying the magnitude of the signal supplied to the input of the power amplifier 45 such that this constant current signal is continuously generated.

The electrode monitoring circuit 23 further includes means for generating a signal representing the voltage differential created between the selected powered electrode and the reference electrode 20 in response to the constant measurement signal generated by the power amplifier 45. As shown in FIG. 2, the reference electrode 20 is connected by the line 22 through a fourth filter circuit, consisting of a capacitor 70 and an inductor 71, to one side of the primary coil of a third transformer 72. The selected powered electrode is connected by the line 28 through a fifth filter circuit, consisting of a capacitor 73 and an inductor 75, to the other side of the primary coil of the transformer 72. When the power amplifier 45 generates the measurement signal, a voltage differential is created between the selected powered electrode and the reference electrode 20. This voltage differential is supplied through the lines 22 and 28 to the sides of the primary coil of the transformer. This voltage differential will be referred to as the sensed voltage signal.

As is well known, the magnitude of a voltage signal is equal to the product of the magnitude of a current signal passing through a resistance and the magnitude of that resistance. If the magnitude of the current signal is made equal to one ampere, then the magnitude of the voltage signal is equal to the magnitude of the resistance. In the electrode monitoring circuit 23 of the present invention, the magnitude of the measurement signal supplied to the selected powered electrode and the reference electrode 20 is equal to one ampere. Therefore, the magnitude of the sensed voltage signal is equal to the sum of the individual resistances of the selected powered electrode, the reference electrode 20, and the pool of molten glass 11 extending between these electrodes. Assuming that the individual resistances of both the reference electrode 20 and the pool of molten glass 11 extending between these electrodes are constant, then the sensed voltage signal is proportional to the resistance of the selected powered electrode alone.

One side of the secondary coil of the transformer 72 is connected to ground potential, while the other side thereof is connected to the non-inverting input of an operational amplifier 76. A conventional gain control circuit 77 is connected in a feedback loop of the operational amplifier 76 to adjust the magnitude of the output signal therefrom in relation to the input signal. Generally, the gain control circuit 77 will be adjusted such that the magnitude of the output signal from the operational amplifier 76 is equal to the magnitude of the sensed voltage signal. The output signal from the operational amplifier 76 is fed to a first input of a second balanced demodulator circuit 80, similar to the first demodulator circuit 60 described above. A second input of the second balanced demodulator circuit 80 is connected to the receive the sensed current signal from the operational amplifier 56, which is fed through a second pair of operational amplifiers 81 and 82. The second pair of operational amplifiers 81 and 82 are identical in structure and operation to the first pair 57 and 58.

The demodulator circuit 80 generates balanced output signals on a pair of lines 80a and 80b to the inverting and non-inverting inputs of an operational amplifier 83. The operational amplifier 83 includes a resistor 85 and a capacitor 86 connected in a feedback loop with the non-inverting input thereto. The operational amplifier 83 generates a direct current output signal which is representative of the magnitude of the sensed voltage signal. The direct current output signal is fed to the input of a conventional analog-to-digital converter circuit 87. The converter circuit 87 generates a digital output signal on a plurality of lines to an interface circuit 88. The digital output signal is representative of the sensed voltage signal. The interface circuit 88 is also conventional in the art and is connected through the bus lines 30 and 31 to the computer 32. The computer 32 interrogates the interface circuit 88 at predetermined intervals to obtain the value of the sensed voltage signal therefrom.

In operation, the firing controllers 15 and 16 cause electrical energy to be supplied to the pairs of powered electrodes **12*a*, 12*b* and 13*a*, 13*b* in order to generate heat within the molten glass 11. As previously mentioned, such electrical energy is generated at a predetermined relatively low frequency. In order to monitor the resistance of one of the powered electrodes during such heating, the computer 32 initially selects one of the powered electrodes, the first powered electrode 12a for example. To do so, the computer 32 generates signals on the lines 33 and 35 to the multiplexers 25 and 26, respectively. In response thereto, the line 25*a* from the powered electrode 12*a* is connected through the multiplexer 25 to the line 27, and the line 26*a* from the powered electrode 12*a* is connected through the multiplexer 26 to the line 28**.

The power amplifier 45 generates the relatively high frequency measurement signal to the powered electrode 12a as described above. That measurement signal, which passes through the powered electrode **12*a* and the reference electrode 20, is sensed by the resistor 52 and the transformer 55. As described above, the sensed current signal is used by the feedback circuit 65 to maintain the output signal generated by the power amplifier 45 at one ampere. At the same time, the sensed voltage signal developed by the transformer 72 is converted to a direct current signal by the demodulator circuit 80 and the operational amplifier 83 and fed through the analog-to-digital converter circuit 87 to the computer 32**.

The computer 32 can compare the value of this signal with predetermined reference levels stored therein to determine whether the resistance of the selected powered electrode **12*a* has changed in such a fashion to indicate an actual or impending failure. For example, the resistance signal can be compared to predetermined upper and lower absolute limits, beyond which a failure is presumed to have occurred. Additionally, the value of the resistance signal can be stored and compared with subsequent values for the same powered electrode 12*a*. By studying a plurality of such signals taken over a period of time, a trend of change in the value of the resistance signal can be ascertained. Such a trend can be used to predict the failure of the powered electrode before the resistance signal moves beyond the absolute ranges noted above. If such a failure is detected, the computer 32 can deactivate the appropriate electrode pair by generating signals to the firing controllers 15 and 16 on the lines 36 and 37. Additionally, the computer 32 can activate the alarm 39 by generating a signal on the line 38**.

Many of the components of the electrode monitoring systems 23 described above are provided to minimize the effects of the heating electrical energy (which is constantly supplied to the pairs of powered electrodes **12*a*, 12*b* and 13*a*, 13*b*) on the measurement signal. As discussed above, the frequency of the measurement signal is preferably unrelated to the frequency of the heating energy and its harmonics. The filter circuits are tuned to reject signals which are not close to the frequency of the measurement signal. The transformers 46, 55, and 72 provide isolation of the measurement circuitry from the electrodes themselves. Finally, the demodulators 60 and 80, which function as synchronous detectors as described above, further reject spurious signals which are not in synchronism with the frequency of the measurement signal. Consequently, the electrode monitoring circuit 23 of the present invention provides an accurate mechanism for individually monitoring the resistance of the powered electrodes while they are in use within the furnace 10**.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

INDUSTRIAL APPLICABILITY

Within glass heating furnaces which use a plurality of electrically powered electrodes, it is desirable to monitor the electrical resistance characteristics of each electrode in order to anticipate a failure. The electrode monitoring system of the present invention provides a means for sensing such electrical resistance characteristics while the furnace is in use.

We claim:

1. In a glass heating furnace including a pool of molten glass and a pair of powered electrodes connected to a source of electrical energy, the powered electrodes being immersed in the pool of molten glass for passing an electrical current therebetween to heat the molten glass, a system for monitoring the electrical resistance of a selected one of the powered electrodes comprising:

a reference electrode immersed in the pool of molten glass;

means for passing a measurement signal between the selected powered electrode and said reference electrode, said measurement signal being distinguishable from the electrical current passing between the powered electrodes; and means for generating a signal representative of the voltage differential across the selected powered electrode and said reference electrode created as a result of said measurement signal, said voltage differential signal being representative of the electrical resistance of the selected powered electrode.

2. The invention defined in claim 1 wherein said measurement signal is an electrical current.

3. The invention defined in claim 2 further including means for generating a signal representative of the magnitude of said electrical current passing between the selected powered electrode and said reference electrode.

4. The invention defined in claim 3 further including means responsive to said current magnitude signal for maintaining the magnitude of said electrical current at a constant value.

5. The invention defined in claim 1 wherein the source of electrical energy passes an electrical current at a first frequency between the powered electrodes, and wherein said means for passing a measurement signal passes an electrical current at a second frequency between the selected powered electrode and said reference electrode, said second frequency being different from said first frequency and any harmonics thereof.

6. The invention defined in claim 1 further including means responsive to said voltage differential signal for generating an alarm signal when said voltage differential signal increases above a predetermined upper threshold.

7. The invention defined in claim 1 further including means responsive to said voltage differential signal for generating an alarm signal when said voltage differential signal decreases below a predetermined lower threshold.

8. The invention defined in claim 1 further including means responsive to said voltage differential signal for generating an alarm signal when said voltage differential signal changes by more than a predetermined amount.

9. The invention defined in claim 1 further including means responsive to said voltage differential signal for generating an alarm signal when said voltage differential signal changes by more than a predetermined amount over a predetermined period of time.

10. In a glass heating furnace including a pool of molten glass and a plurality of powered electrodes immersed therein, the powered electrodes being connected to a source of electrical energy for passing electrical currents between respective pairs thereof to heat the molten glass, a system for monitoring the electrical resistances of the powered electrodes comprising:

a reference electrode immersed in the pool of molten glass;

means for passing a measurement signal between sequentially selected ones of the powered electrodes and said reference electrode; and means for generating signals representative of the voltage differentials across the each of the sequentially selected powered electrodes and said reference electrode created as a result of said measurement signal, said voltage differential signals being representative of the electrical resistances of each of the sequentially selected powered electrodes.

11. The invention defined in claim 10 wherein said means for passing a measurement signal includes a source of electrical current and multiplexer means for sequentially connecting said source of electrical current to each of the powered electrodes.

12. The invention defined in claim 10 wherein said means for generating signals includes multiplexer means for sequentially connecting each of the powered electrodes to an electrode monitoring circuit.

13. A glass heating furnace comprising:

a reservoir containing a pool of molten glass therein;

a plurality of powered electrodes immersed in said pool of molten glass;

a source of electrical energy, said powered electrodes being connected to said source of electrical energy for passing an electrical current at a first frequency between respective pairs thereof to heat the molten glass;

a reference electrode immersed in said pool of molten glass;

means for passing an electrical current measurement signal at a second frequency between sequentially selected ones of the powered electrodes and said reference electrode, said second frequency being different from said first frequency and any harmonics thereof; and means for generating signals representative of the voltage differentials across the each of the sequentially selected powered electrodes and said reference electrode created as a result of said measurement signal, said voltage differential signals being representative of the electrical resistances of each of the sequentially selected powered electrodes.

14. In a glass heating furnace including a pool of molten glass and a pair of powered electrodes connected to a source of electrical energy, the powered electrodes being immersed in the pool of molten glass for passing an electrical current therebetween to heat the molten glass, a method of monitoring the electrical resistance of a selected one of the powered electrodes comprising the steps of:

(a) immersing a reference electrode in the pool of molten glass;

(b) passing a measurement signal between the selected powered electrode and said reference electrode, said measurement signal being distinguishable from the electrical current passing between the powered electrodes; and (c) generating a signal representative of the voltage differential across the selected powered electrode and said reference electrode created as a result of said measurement signal, said voltage differential signal being representative of the electrical resistance of the selected powered electrode.

15. The invention defined in claim 14 wherein step (b) includes passing an electrical current between the selected powered electrode and said reference electrode.

16. The invention defined in claim 15 further including the step of generating a signal representative of the magnitude of the electrical current passing between the selected powered electrode and said reference electrode.

17. The invention defined in claim 16 further including the step of maintaining the magnitude of the electrical current at a constant value in response to the current magnitude signal.

18. The invention defined in claim 14 wherein the source of electrical energy passes an electrical current at a first frequency between the powered electrodes, and wherein said step of passing a measurement signal includes passing an electrical current at a second frequency between the selected powered electrode and said reference electrode, said second frequency being different from said first frequency and any harmonics thereof.

* * * * *